US008348291B1

United States Patent
Sedman et al.

(10) Patent No.: US 8,348,291 B1
(45) Date of Patent: Jan. 8, 2013

(54) SUSPENSION STRUT BEARING DEFLECTOR SEAL

(75) Inventors: Myron P. Sedman, Beverly Hills, MI (US); David M. Caldwell, Roseville, MI (US); Ferdous M. Ghazi, Troy, MI (US); James Logan, Jr., South Lyon, MI (US); William A. Morris, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/205,902

(22) Filed: Aug. 9, 2011

(51) Int. Cl.
*B60G 15/02* (2006.01)
*F16C 33/78* (2006.01)

(52) U.S. Cl. ........ 280/155; 267/221; 384/119; 384/147; 384/151

(58) Field of Classification Search ........... 280/124.147, 280/124.146, 124.145, 124.154, 124.155; 267/217, 220, 219, 221; 384/441, 607, 590, 384/119, 124, 130, 140, 147, 151, 152, 153
See application file for complete search history.

(56) References Cited

U.S. PATENT DOCUMENTS

| 4,324,443 | A  | * | 4/1982  | Dagiel            | 384/607    |
|-----------|----|---|---------|-------------------|------------|
| 5,344,241 | A  | * | 9/1994  | Wells             | 384/607    |
| 7,837,016 | B2 | * | 11/2010 | Chamousset et al. | 188/321.11 |
| 2008/0048370 | A1 | * | 2/2008 | Corlet et al. | 267/220 |
| 2010/0308555 | A1 | * | 12/2010 | Lenon et al. | 280/124.155 |
| 2011/0101584 | A1 | * | 5/2011 | Viault et al. | 267/221 |
| 2011/0133379 | A1 | * | 6/2011 | Viault et al. | 267/217 |
| 2011/0291337 | A1 | * | 12/2011 | Viault et al. | 267/220 |
| 2012/0146306 | A1 | * | 6/2012 | Dubus et al. | 280/124.155 |

* cited by examiner

*Primary Examiner* — Drew Brown

(57) ABSTRACT

A suspension strut includes a suspension strut bearing and a deflector seal. The suspension strut bearing has an upper portion mounted above a lower portion and a bearing seal mounted therebetween. The upper portion does not rotate with a steerable assembly while the lower portion does, with the upper portion including a lower surface adjacent to a seal opening. The deflector seal is elastomeric and is a toroidal shape, having a radially inner portion and a radially outer portion. The inner portion is secured against the lower portion of the strut bearing, and the outer portion is cantilevered outward from the inner portion to allow for elastic flexing of the outer portion. The outer portion allows for upward elastic flexing into contact with the lower surface of the upper portion of the strut bearing when a fluid or contaminant impinges upon a lower surface of the outer portion.

7 Claims, 2 Drawing Sheets

SUSPENSION STRUT BEARING DEFLECTOR SEAL

BACKGROUND OF INVENTION

The present invention relates generally to suspension struts in a vehicle and more particularly to a deflector seal used in a strut bearing assembly.

Passenger vehicles often have front suspension systems that use a strut to provide a damping assembly in parallel with a spring for ride comfort. The strut is attached between the body structure and the steering knuckle. As the steering knuckle rotates during a vehicle turning event, the rotation of the strut relative to the stationary body structure is carried through an integral bearing. The position of this bearing exposes it to the underbody conditions of water, grit and corrosive debris. A means of preventing intrusion of these contaminants into the bearing is required in order to prevent corrosion and ensure long term bearing durability.

Attempts to prevent intrusion into the strut bearing that have been used in the past include contacting lip seals, bearing shields and protective greases. Contacting lip seals are integral to the suspension bearing. These seals are normally molded or added elements that are integral to either the rotating or static portion of the bearing—outboard of the rolling elements. While effective at sealing, the static/dynamic characteristics of the sealing lips can present a parasitic drag (torque) that varies with loading or temperature that could be felt through the steering system.

Bearing shields are normally rigid elements that are non-contacting that reduce or shield the exposed area of the bearing opening. While effective at shielding direct contaminant and water exposure, the underbody dynamics of contaminants and water moving through the air create exposures that are beyond line-of-sight, which may allow for contaminants and water to enter the bearing.

Protective greases can be used. By filling the bearing with grease, this can prevent water and contaminant intrusion. However, the grease can create a parasitic drag on the bearing that is exacerbated by low temperatures as the grease becomes stiffer. Experience shows that the effectiveness of the grease can diminish over time as it becomes diluted with water and the contaminant content of the grease increases.

SUMMARY OF INVENTION

An embodiment contemplates a suspension strut for use in a steerable assembly of a vehicle that includes a suspension strut bearing and a deflector seal. The suspension strut bearing may have an upper portion mounted above a lower portion and a bearing seal mounted between the upper portion and the lower portion. The upper portion does not rotate with the steerable assembly and the lower portion rotates with the steerable assembly, with the upper portion including a lower surface adjacent to and radially outboard of a seal opening between the upper portion and the lower portion. The deflector seal is made of an elastomeric material and is a toroidal shape, with the deflector seal having a radially inner portion and a radially outer portion. The radially inner portion is secured against the lower portion of the suspension strut bearing, and the radially outer portion is cantilevered radially outward from the radially inner portion to allow for elastic flexing of the radially outer portion. The radially outer portion allows for upward elastic flexing into contact with the lower surface of the upper portion of the suspension strut bearing when a fluid or contaminant impinges upon a lower surface of the radially outer portion.

An advantage of an embodiment is that the deflector seal employed with the suspension strut bearing of the suspension strut prevent underbody liquid and contaminants from getting into the labyrinth seal opening in the strut bearing, while minimizing concerns with noise, parasitic drag and temperature variations. This helps to ensure long term durability of the strut bearing, while also minimizing the cost and mass of the assembly.

DETAILED DESCRIPTION

Figure 1:
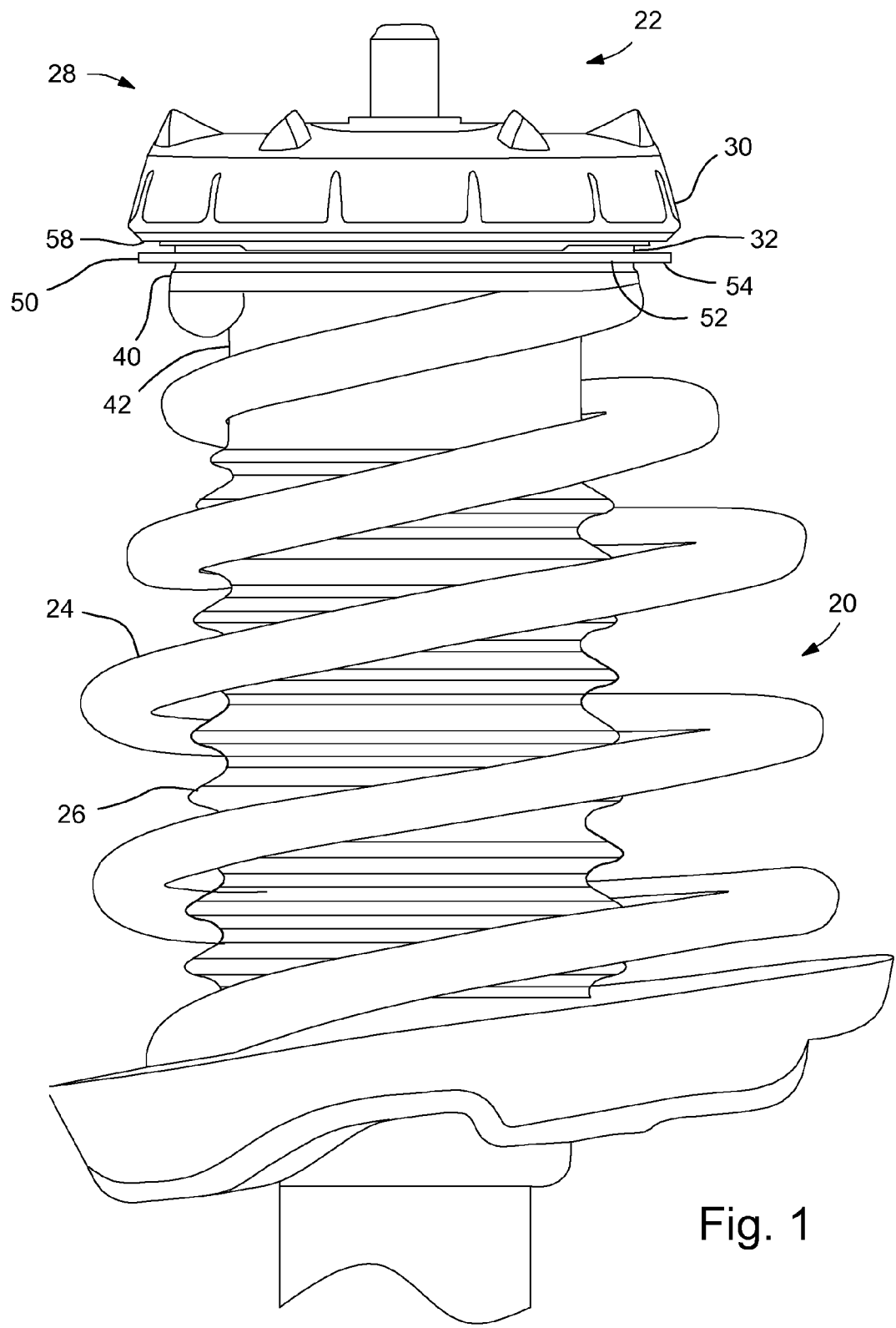
FIG. 1 is an elevation view of a portion of a suspension strut for use in an automotive vehicle.
Figure 2:
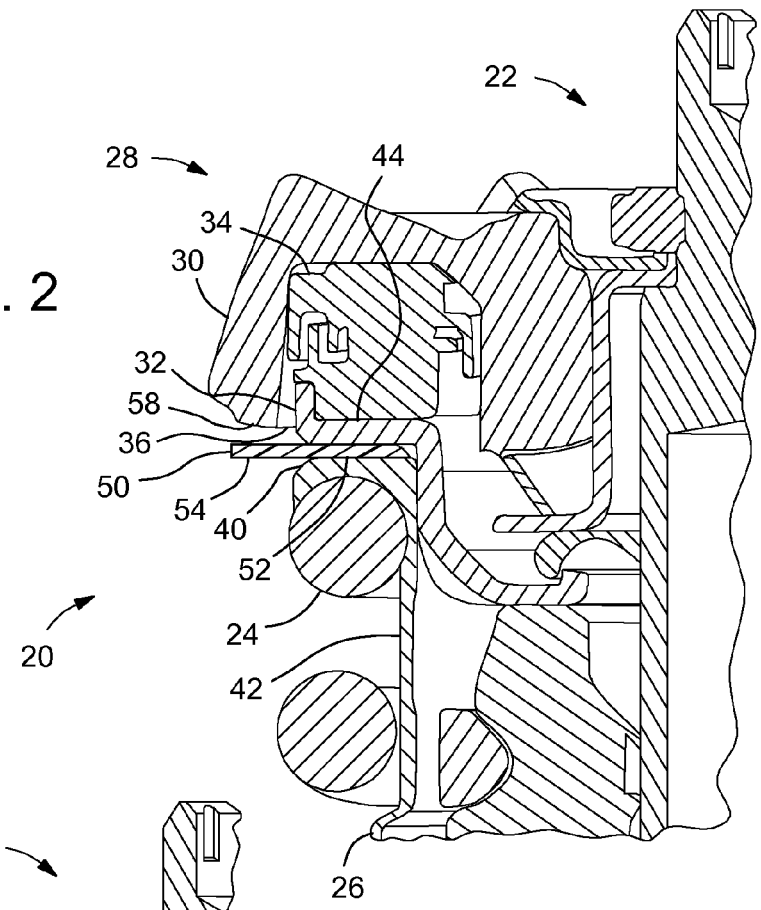
FIG. 2 is a cross section through a portion of the suspension strut, with a deflector seal in a relaxed position.
Figure 3:
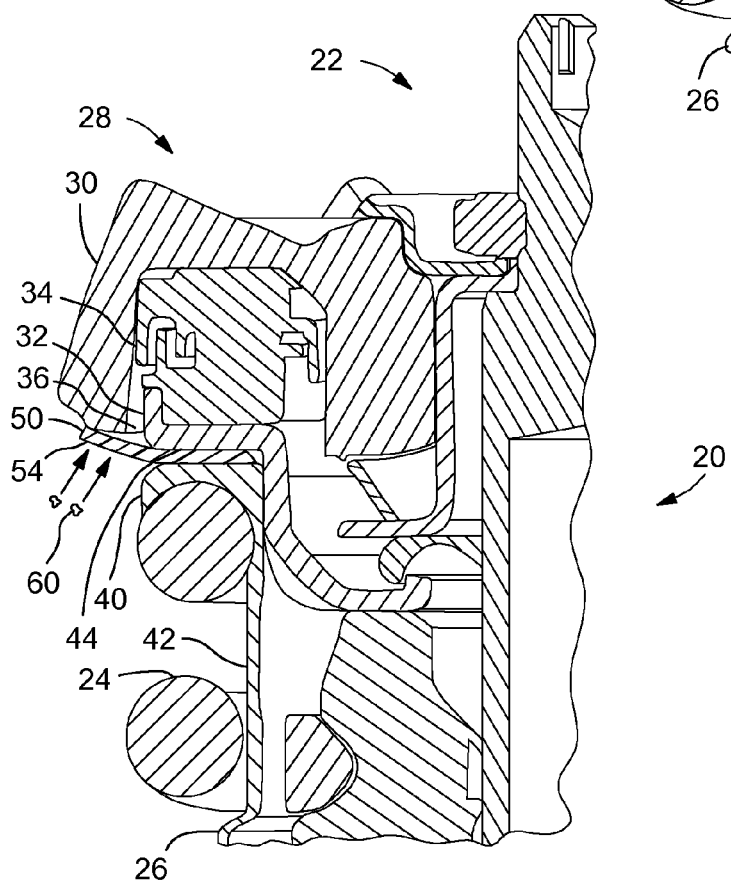
FIG. 3 is a cross sectional view similar to FIG. 2, but with the deflector seal in a deflected position.

Referring to FIGS. 1-3, a portion of a suspension strut 20 is shown, which forms a part of a steerable assembly in a vehicle. The suspension strut 20 is a strut that may be employed in a front suspension of a vehicle, where the bottom of the strut 20 attaches to a steering knuckle (not shown) and the top of the strut 20 attaches to body structure (not shown). The steering knuckle and the body structure may be conventional and so are not discussed in detail herein.

The suspension strut 20 includes a body mount 22 at the upper end that secures the strut 20 to the vehicle body. A spring 24 mounts around a damping assembly 26 that supports a portion of the vehicle. The spring 24 and damping assembly 26 may be conventional and so will not be discussed further herein.

Adjacent to the body mount 22 is a suspension strut bearing 28, which is a rotational bearing. This bearing 28 allows the suspension strut 20 to mount between the fixed body structure and the pivotable steering knuckle. The suspension strut bearing 28 includes an upper portion 30 that is rotationally fixed relative to the vehicle body and a lower portion 32 that rotates with the steering knuckle. In between the two portions 30, 32 is a labyrinth seal 34. A labyrinth seal opening 36 is formed between the upper and lower portions 30, 32.

A spring support flange 40 extending from a damper assembly housing 42 supports the upper end of the spring 24. This flange 40, along with a radially extending flange 44 on the lower portion 32 of the bearing 28, sandwiches a deflector seal 50 between them.

The deflector seal 50 is made of an elastomeric material that can flex. The deflector seal 50 has a toroidal shape that may be flat on both the top and bottom sides. The radially inner portion 52 of the deflector seal 50 is supported and held in place by the fact that it is sandwiched between flanges 40, 44. The radially outer portion 54 is not secured to or sandwiched between any members—it is, in effect, free floating. The radially outer portion 54 extends radially outward far enough to extend past the labyrinth seal opening 36 and to allow it to flex upward into a lower surface 58 of the upper portion 30 of the bearing 28.

The operation of the deflector seal 50 of the suspension strut 20 will now be discussed. As the vehicle is driven and wheels turned to steer the vehicle, the suspension strut 20 supports the vehicle via the steering knuckle while also allowing the steering knuckle to turn relative to the vehicle structure. As the steering knuckle is turned, the spring 24, damping assembly 26, lower portion 32 of the bearing 28, and the deflector seal 50 all pivot with the steering knuckle, while the upper portion 30 of the seal 28 does not pivot.

As the vehicle is driven, the deflector seal 50 remains in a relaxed position (shown in FIGS. 1 and 2), where it does not contact the upper portion 30 of the bearing 28. Since there is no contact, then issues concerning noise from the deflector seal 50 rubbing against the upper portion 30 are avoided. Also, since under most conditions the deflector seal 50 does not contact the upper portion 30, there is no parasitic drag between the two components during steering events. Moreover, temperature variations doe not affect the bearing rotational torque since large amounts of grease to seal the bearing 28 are not needed, as is the case with some prior art configurations.

As the vehicle is driven in weather or on road conditions where water and other contaminants 60 might be thrown up from under the body, the force of the water and/or contaminants 60 being thrown up (see direction of arrows in FIG. 3) into the deflector seal 50 will cause the radially outer portion 54 of the seal 50 to temporarily deflect upward into contact with the lower surface 58 of the upper portion 30 of the bearing 28 (see FIG. 3). This deflection will cause the seal 50 to seal against the lower surface 58, thus preventing the water and contaminants 60 from getting into the labyrinth seal opening 36. Thus, the seal 50 is deflected by the very media that it is trying to protect the labyrinth seal 34 from.

As the water and/or contaminants 60 fall away, the deflector seal 50 flexes back down to its relaxed state (see FIGS. 1 and 2), thus avoiding the concerns discussed above when a seal is in constant contact with both portions 30, 32 of the bearing 28.

The deflector seal 50 or the geometry of elements supporting the deflector seal may be non-symmetrical in the direction of activation versus downward flexing, if so desired. That is, to better encourage deflection of the deflector seal 50 in the upward direction while limiting the downward deflection below the relaxed position, the spring support flange 40 (or some element extending therefrom) may extend radially outward farther than the radially extending flange 44 on the lower portion 32 of the bearing 28 or may be stiffer on the top than the bottom. Alternatively, or in addition to this, the deflector seal 50 may be formed with properties or layers that allow for easier flexing in the upward direction rather than the downward direction.

While certain embodiments of the present invention have been described in detail, those familiar with the art to which this invention relates will recognize various alternative designs and embodiments for practicing the invention as defined by the following claims.

What is claimed is:

1. A suspension strut for use in a steerable assembly of a vehicle comprising:
    a suspension strut bearing having an upper portion mounted above a lower portion and a bearing seal mounted between the upper portion and the lower portion, the upper portion configured to not rotate with the steerable assembly and the lower portion configured to rotate with the steerable assembly, the upper portion including a lower surface adjacent to and radially outboard of a seal opening between the upper portion and the lower portion; and
    a deflector seal that is made of an elastomeric material and is a toroidal shape, the deflector seal having a radially inner portion and a radially outer portion, the radially inner portion being secured against the lower portion of the suspension strut bearing, and the radially outer portion being cantilevered radially outward from the radially inner portion to allow for elastic flexing of the radially outer portion, the radially outer portion configured to allow for upward elastic flexing into contact with the lower surface of the upper portion of the suspension strut bearing when a fluid or contaminant impinges upon a lower surface of the radially outer portion.

2. The suspension strut of claim 1 wherein the toroidal shape of the deflector seal is a toroidal, flat plate shape.

3. The suspension strut of claim 2 wherein the bearing seal is a labyrinth seal.

4. The suspension strut of claim 1 wherein the bearing seal is a labyrinth seal.

5. The suspension strut of claim 1 including a coil spring surrounding a damping assembly, the damping assembly including a spring support flange securing a top end of the spring, and wherein the spring support flange is secured against a lower surface of the radially inner portion of the deflector seal.

6. The suspension strut of claim 5 wherein the lower portion of the suspension strut bearing includes a radially extending flange, and wherein the radially extending flange is secured against an upper surface of the radially inner portion of the deflector seal.

7. A method of limiting intrusion of fluids and contaminants into a seal opening in a suspension strut bearing of a suspension strut employed in a steerable assembly of a vehicle, the method comprising the steps of:
    providing the suspension strut bearing having an upper portion mounted above a lower portion and a bearing seal mounted between the upper portion and the lower portion, the upper portion configured to not rotate with the steerable assembly and the lower portion configured to rotate with the steerable assembly, the upper portion including a lower surface adjacent to and radially outboard of a seal opening between the upper portion and the lower portion; and
    providing a deflector seal that is made of an elastomeric material and is a toroidal shape, the deflector seal having a radially inner portion and a radially outer portion, the radially inner portion being secured against the lower portion of the suspension strut bearing, and the radially outer portion being cantilevered radially outward from the radially inner portion to allow for elastic flexing of the radially outer portion, the radially outer portion upwardly elastically flexing into contact with the lower surface of the upper portion of the suspension strut bearing when the fluid or the contaminant impinges upon a lower surface of the radially outer portion.

* * * * *